(12) United States Patent
Arisato

(10) Patent No.: US 10,400,904 B2
(45) Date of Patent: Sep. 3, 2019

(54) RELIEF VALVE DEVICE

(71) Applicant: KOSMEK LTD., Hyogo (JP)

(72) Inventor: Akira Arisato, Hyogo (JP)

(73) Assignee: KOSMEK LTD, Hyogo (JP)

( * ) Notice: Subject to any disclaimer, the term of this patent is extended or adjusted under 35 U.S.C. 154(b) by 0 days.

(21) Appl. No.: 15/508,189

(22) PCT Filed: Oct. 21, 2015

(86) PCT No.: PCT/JP2015/079733
§ 371 (c)(1),
(2) Date: Mar. 2, 2017

(87) PCT Pub. No.: WO2016/072269
PCT Pub. Date: May 12, 2016

(65) Prior Publication Data
US 2017/0284553 A1 Oct. 5, 2017

(30) Foreign Application Priority Data
Nov. 6, 2014 (JP) .................................. 2014-238191

(51) Int. Cl.
*F16K 17/10* (2006.01)
*F16K 39/00* (2006.01)
(Continued)

(52) U.S. Cl.
CPC ............ *F16K 17/10* (2013.01); *F16K 17/044* (2013.01); *F16K 17/0473* (2013.01);
(Continued)

(58) Field of Classification Search
CPC .. F16K 17/105; F16K 17/10; Y10T 137/7841; Y10T 137/7766
See application file for complete search history.

(56) References Cited

U.S. PATENT DOCUMENTS 3,207,179 A   9/1965 Klagues
3,208,473 A * 9/1965 Budzich ................ F16K 17/105
                                            137/490
(Continued)

FOREIGN PATENT DOCUMENTS

JP    S63318372 A    12/1988
JP    11-280928 A    10/1999
(Continued)

OTHER PUBLICATIONS

International Search Report dated Jan. 19, 2016 for PCT/JP2015/079133 with English translation.
(Continued)

*Primary Examiner* — Reinaldo Sanchez-Medina
*Assistant Examiner* — Nicole Gardner
(74) *Attorney, Agent, or Firm* — Bacon & Thomas, PLLC

(57) ABSTRACT

A first relief valve chamber (3) of a main relief valve (10) and a second relief valve chamber (7) of an auxiliary relief valve (11) are provided in series in a valve case 1. The first relief valve chamber (3) includes a valve seat chamber (4) at the right and a valve chamber (5) at the left. A first valve member (30) in the valve chamber (5) is biased toward a valve seat member (18) in the valve seat chamber (4) by a first relief spring (40). A second valve member (48) in the second relief valve chamber (7) is biased toward a second valve seat (47) by a second relief spring (50).

5 Claims, 3 Drawing Sheets

(51) Int. Cl.
*F16K 43/00* (2006.01)
*F16K 39/02* (2006.01)
*F16K 17/04* (2006.01)

(52) U.S. Cl.
CPC ............ *F16K 39/00* (2013.01); *F16K 39/024* (2013.01); *F16K 39/026* (2013.01); *F16K 43/006* (2013.01)

(56) References Cited

U.S. PATENT DOCUMENTS

| | | | | |
|---|---|---|---|---|
| 3,330,298 | A | * | 7/1967 | Allen .................... F16K 17/105 137/491 |
| 3,608,576 | A | * | 9/1971 | Wilhelm ............... F16K 17/105 137/242 |
| 6,805,155 | B2 | * | 10/2004 | Slawinski ............. F16K 17/105 137/489 |
| 7,077,157 | B2 | * | 7/2006 | Cavagna ................. F16K 17/10 137/329.3 |
| 2004/0089347 | A1 | | 5/2004 | Cavagna |

FOREIGN PATENT DOCUMENTS

| | | |
|---|---|---|
| JP | 2001263516 A | 9/2001 |
| JP | 2005-48796 A | 2/2005 |
| JP | 2008-121289 A | 5/2008 |
| JP | 2012-255484 A | 12/2012 |

OTHER PUBLICATIONS

Office Action dated May 8, 2018, issued in corresponding Japanese Application No. 2014-238191 with English translation.
Office Action dated Nov. 20, 2018, issued in corresponding Japanese Application No. 2014-238191.
Office Action dated Apr. 23, 2019, issued in corresponding Japanese Application No. 2014-238191.

* cited by examiner

RELIEF VALVE DEVICE

TECHNICAL FIELD

The present invention relates to a relief valve device used for a hydraulic overload safety device for a mechanical press, a hydraulic pump, and the like.

BACKGROUND ART

Known examples of such a relief valve device include a device described in Patent Literature 1 (Japanese Unexamined Patent Publication No. S63-318372). In the known relief valve device, two relief valves are disposed in parallel to each other in a valve case. Each of the relief valves is structured as follows.

A relief valve chamber is provided in the valve case. An Inlet hole of the relief valve chamber is communicatively connected to a hydraulic pump and to a hydraulic oil chamber of and a hydraulic device. An outlet hole of the relief valve chamber is communicatively connected to an oil tank. A valve seat member having a valve seat is pressed onto a right end wall of a left space of the relief valve chamber. A valve member having a valve surface is inserted into a right space of the relief valve chamber so as to be movable in a left-right direction, and the valve member is biased toward the valve seat of the valve seat member by a relief spring. When high-pressure oil is supplied to the inlet hole of the relief valve chamber and the hydraulic pressure in an inlet-side portion of the relief valve chamber, which is close to the inlet hole, exceeds a set pressure, the valve surface of the valve member is separated from the valve seat of the valve seat member against the biasing force of the relief spring, with the result that the relief valve is opened.

CITATION LIST

Patent Literature

Patent Literature 1: Japanese Unexamined Patent Publication No. S63-318372

SUMMARY OF INVENTION

Technical Problem

The above-described known device has the following disadvantage.

When the valve of the relief valve device is opened and the high-pressure oil in the inlet-side portion of the relief valve chamber is discharged to an outlet-side portion of the relief valve chamber, the high-pressure oil rapidly flows through a gap created between the valve surface and the valve seat when the valve is open. Because of this, at least one of the valve surface and the valve seat rapidly wears out, which reduces the durability of the relief valve device.

An object of the present invention is to improve the durability of a relief valve device.

Solution to Problem

In order to achieve the above object, in a first aspect of the present invention, a relief valve device is structured as follows, for example, as shown in FIG. 1 to FIG. 2D or in FIG. 3.

A main relief valve 10 and an auxiliary relief valve 11 are provided in series in a valve case 1. A relief pressure of the auxiliary relief valve 11 set by a second biasing member 50 provided for the auxiliary relief valve 11 is lower than a relief pressure of the main relief valve 10 set by a first biasing member 40 provided for the main relief valve 10.

In the first aspect, the following functions and effects are provided.

When the pressure of the pressure fluid in an inlet-side portion of the main relief valve exceeds the relief pressure of the main relief valve, the pressure fluid opens the main relief valve and flows to an outlet-side portion of the main relief valve. At this time, because the pressure in the outlet-side portion of the main relief valve is kept at a predetermined value by the auxiliary relief valve, there is a small difference between the pressure in the inlet-side portion and the pressure in the outlet-side portion. For this reason, the pressure fluid gently flows through a gap created when the main relief valve is open. This prevents rapid wearing out of components of the main relief valve, to improve the durability of the relief valve device.

In order to achieve the above object, in a second aspect of the present invention, a relief valve device is structured as follows, for example, as shown in FIG. 1 to FIG. 2D or in FIG. 3.

A first relief valve chamber 3 of a main relief valve 10 and a second relief valve chamber 7 of an auxiliary relief valve 11 are communicatively connected in order in a valve case 1. The main relief valve 10 includes a valve seat member 18 provided in the first relief valve chamber 3. A first valve member 30 is inserted into the first relief valve chamber 3 so as to be movable, and the first valve member 30 is biased toward the valve seat member 18 by a first biasing member 40 provided in the valve case 1. A first valve surface 35 is provided on the first valve member 30. A first valve seat 25 is provided on the valve seat member 18 so as to face the first valve surface 35. The auxiliary relief valve 11 includes a second valve member 48 inserted into the second relief valve chamber 7 so as to be movable. A second valve surface 49 is provided on the second valve member 48. A second valve seat 47 is provided in the second relief valve chamber 7 so as to face the second valve surface 49. A second biasing member 50 is provided in the valve case 1 so as to bias the second valve surface 49 toward the second valve seat 47. A relief pressure of the auxiliary relief valve 11 set by the second biasing member 50 is lower than a relief pressure of the main relief valve 10 set by the first biasing member 40.

In the second aspect, the following functions and effects are provided.

When the pressure in an inlet-side portion of the first relief valve chamber exceeds the relief pressure of the main relief valve set by the first biasing member, the main relief valve is opened. When the pressure in the inlet-side portion of the first relief valve chamber falls below the relief pressure of the main relief valve, the main relief valve is closed. Further, when the pressure in an outlet-side portion of the first relief valve chamber exceeds the relief pressure of the auxiliary relief valve set by the second biasing member, the auxiliary relief valve is opened. When the pressure in the outlet-side portion of the first relief valve chamber falls below the relief pressure of the auxiliary relief valve, the auxiliary relief valve is closed.

Due to the above structures, when the pressure in the inlet-side portion of the first relief valve chamber exceeds the relief pressure of the main relief valve, the main relief valve is opened, and the pressure fluid in the inlet-side portion of the first relief valve chamber flows to the outlet-side portion of the first relief valve chamber. At this time, because the pressure in the outlet-side portion of the first relief valve chamber is kept at a predetermined value by the auxiliary relief valve, there is a small difference between the pressure in the inlet-side portion and the pressure in the outlet-side portion. For this reason, the pressure fluid gently flows through the gap between the first valve surface and the first valve seat. This prevents rapid wearing out of at least one of the first valve surface and the first valve seat, to improve the durability of the relief valve device.

In order to achieve the above object, in a third aspect of the present invention, a relief valve device is structured as follows.

A first relief valve chamber 3 of a main relief valve 10 and a second relief valve chamber 7 of an auxiliary relief valve 11 are communicatively connected in order in a valve case 1. The main relief valve 10 includes a first valve member 30 inserted into the first relief valve chamber 3 so as to be movable. A first valve surface 35 is provided on the first valve member 30. A first valve seat is provided in the first relief valve chamber 3 so as to face the first valve surface 35. A first biasing member 40 is provided in the valve case 1 so as to bias the first valve surface 35 toward the first valve seat. The auxiliary relief valve 11 includes a second valve member 48 inserted into the second relief valve chamber 7 so as to be movable. A second valve surface 49 is provided on the second valve member 48. A second valve seat 47 is provided in the second relief valve chamber 7 so as to face the second valve surface 49. A second biasing member 50 is provided in the valve case 1 so as to bias the second valve surface 49 toward the second valve seat 47. A relief pressure of the auxiliary relief valve 11 set by the second biasing member 50 is lower than a relief pressure of the main relief valve 10 set by the first biasing member 40.

In the third aspect, functions and effects similar to those in the second aspect are provided.

It is preferable to incorporate the following features (1) and (2) into the second and third aspects of the invention.

(1) As shown in FIG. 3, for example, the auxiliary relief valve 11 is provided inside the first valve member 30.

In this case, the auxiliary relief valve is easily machined as compared with a case where the auxiliary relief valve is provided in the valve case. This enables efficient production and compactness of the relief valve device.

(2) As shown in FIG. 1 to FIG. 2D or in FIG. 3, for example, a through hole 19 is provided through the valve seat member 18, and a pin 20 is inserted into the through hole 19. A fitting gap between the pin 20 and the through hole 19 forms a throttle passage 21.

In this arrangement, the pressure fluid in the inlet-side portion of the first relief valve chamber gently flows to the outlet-side portion through the throttle passage. This prevents rapid wearing out of at least one of the first valve surface and the first valve seat. Because of this, the durability of the relief valve device is further improved.

BRIEF DESCRIPTION OF THE DRAWINGS

FIG. 2A shows an initial state of the relief valve device. FIG. 2B shows a state where a main relief valve and an auxiliary relief valve are closed. FIG. 2C shows a state where the main relief valve and the auxiliary relief valve are open. FIG. 2D shows a state where the main relief valve is closed while the auxiliary relief valve is open.

DESCRIPTION OF EMBODIMENTS

Figure 1:
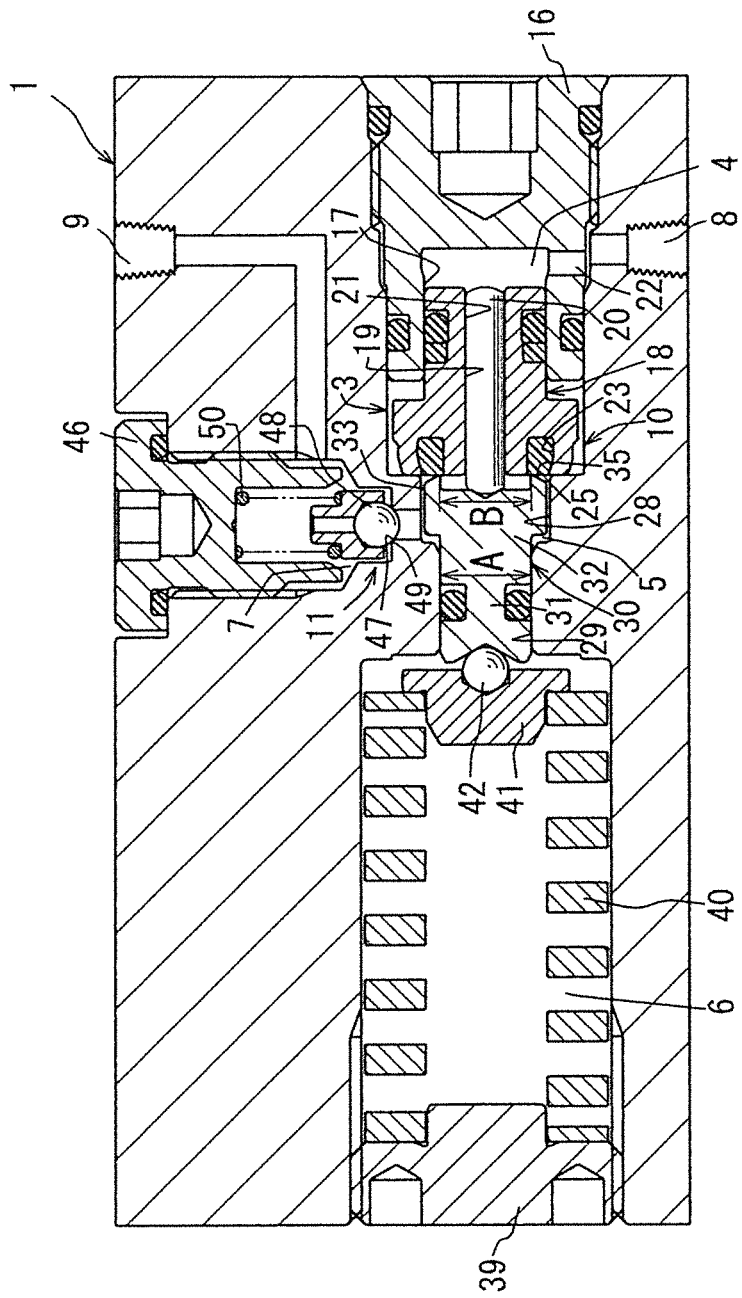
FIG. 1 shows First Embodiment of the present invention, and is a cross section of a relief valve device.

FIG. 1A to FIG. 2D show First Embodiment of the present invention. To begin with, the structure of the relief valve device of First Embodiment will be described, with reference to FIG. 1 illustrating a closed state.

A main relief valve 10 and an auxiliary relief valve 11 are provided in series in a valve case 1. To be more specific, a first relief valve chamber 3 of the main relief valve 10 and a spring chamber 6 are coaxially disposed in the valve case 1 so that the first relief valve chamber 3 and the spring chamber 6 are communicatively connected in order from a right end face to a left end face of the valve case 1. The first relief valve chamber 3 includes: a valve seat chamber 4 provided in a right portion (in an inlet-side portion) of the first relief valve chamber 3; and a valve chamber 5 provided in a left portion (in an outlet-side portion) of the first relief valve chamber 3. A second relief valve chamber 7 of the auxiliary relief valve 11 is provided in an upper portion of the valve case 1. An inlet hole 8 provided at a lower portion of the valve case 1 is communicatively connected to the valve seat chamber 4, and an outlet hole 9 provided at an upper portion of the valve case 1 is communicatively connected to the second relief valve chamber 7. The inlet hole 8 is communicatively connected to a hydraulic pump and a hydraulic oil chamber of a hydraulic device (not illustrated). The outlet hole 9 is communicatively connected to an oil tank (not illustrated).

The main relief valve 10 is structured as follows.

A first lid member 16 is screwed to a right end portion of the valve seat chamber 4. The first lid member 16 has, at a left end portion thereof, an accommodation hole 17. A valve seat member 18 is hermetically inserted into the accommodation hole 17 so as to be movable in a left-right direction. The valve seat member 18 has a through hole 19 extending in the left-right direction, and a pin 20 is inserted into the through hole 19. A fitting gap between the pin 20 and the through hole 19 forms a throttle passage 21. The first lid member 16 has a passage 22 which establishes communication between the accommodation hole 17 and the inlet hole 8. The valve seat member 18 has, at its left end portion, an annular groove 23. Into the annular groove 23, an elastic member made of resin, for example, is attached. A left end face of the elastic member forms a first valve seat 25.

The valve chamber 5 of the first relief valve chamber 3 has a larger diameter hole 28 and a smaller diameter hole 29, which are arranged in order from the right to the left. A smaller diameter portion 31 of a first valve member 30 is hermetically inserted into the smaller diameter hole 29 so as to be movable in the left-right direction. A larger diameter portion 32 of the first valve member 30 is inserted into the larger diameter hole 28. A gap between the larger diameter portion 32 and the larger diameter hole 28 forms a relief passage 33. The first valve member 30 has, on its right end portion, an annular first valve surface 35. The first valve surface 35 faces the first valve seat 25.

An adjustment screw 39 is screwed into a left end portion of the spring chamber 6. A first relief spring 40 functioning as a first biasing member is disposed between the adjustment screw 39 and the first valve member 30. The first relief spring 40 biases the first valve member 30 rightward via a spring seat 41 and a ball 42.

In the above-described main relief valve 10, when the hydraulic pressure in the valve seat chamber 4 exceeds a pressure equivalent to the biasing force of the first relief spring 40 (relief pressure of the main relief valve), the first valve surface 35 is separated from the first valve seat 25, with the result that the main relief valve 10 is opened. Meanwhile, when the hydraulic pressure in the valve seat chamber 4 falls below the pressure equivalent to the biasing force of the first relief spring 40, the first relief spring 40 presses the first valve surface 35 onto the first valve seat 25, with the result that the main relief valve 10 is closed.

The main relief valve is arranged such that a sealing cross sectional area A of the smaller diameter portion 31 of the first valve member 30 sealed by the smaller diameter hole 29 of the valve chamber 5 is substantially equal to a sealing area B of the first valve member 30 sealed by the first valve surface 35 and the first valve seat 25. Because of this arrangement, in regard to the hydraulic pressure in the valve chamber 5 applied to the larger diameter portion 32 of the first valve member 30, the hydraulic pressure applied rightward to the larger diameter portion 32 is substantially equal to the hydraulic pressure applied leftward to the larger diameter portion 32. For this reason, the first valve member 30 is not moved in the left-right direction by the hydraulic pressure in the valve chamber 5. As a consequence, the main relief valve 10 is opened promptly after the hydraulic pressure in the valve seat chamber 4 exceeds the pressure equivalent to the biasing force of the first relief spring 40. Meanwhile, the main relief valve 10 is closed promptly after the hydraulic pressure in the valve seat chamber 4 falls below the pressure equivalent to the biasing force of the first relief spring 40.

The auxiliary relief valve 11 is structured as follows.

A second lid member 46 is screwed to an upper end portion of the second relief valve chamber 7. A second valve seat 47 is provided on a lower end portion of the second relief valve chamber 7. A second valve surface 49 on a ball (second valve member) 48 is biased toward the second valve seat 47 by a second relief spring (second biasing member) 50. The valve chamber 5 is communicatively connected to a central portion of the second valve seat 47.

The above-described relief valve device operates as follows, as shown in FIG. 2A to FIG. 2D.

Figure 2A:
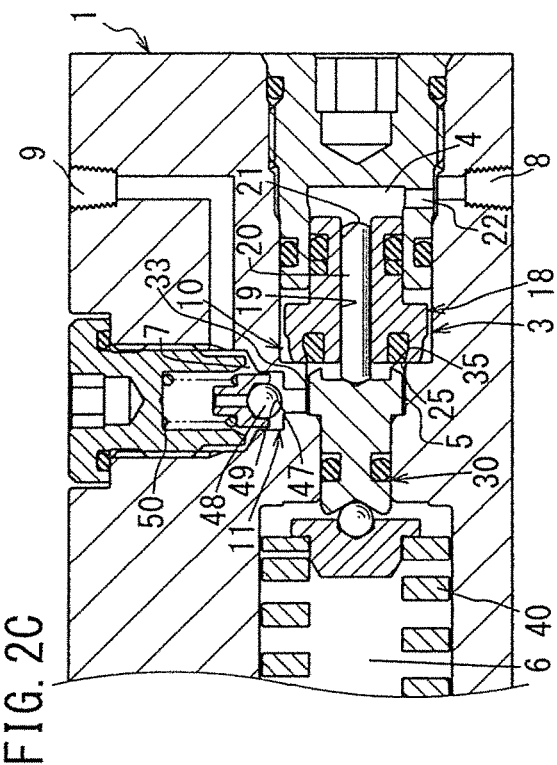
FIG. 2A to FIG. 2D each is a partial view similar to FIG. 1, for explaining the operation of the relief valve device.

In an initial state shown in FIG. 2A, oil is filled from the inlet hole 8 to the outlet hole 9, but hydraulic pressure is not applied to the inlet hole 8. The first relief spring 40 has moved the first valve member 30 rightward. Furthermore, the valve seat member 18 has been moved rightward, and the first valve seat 25 is spaced apart from the first valve surface 35 with a predetermined gap between them.

When pressure oil is supplied to the inlet hole 8 in the initial state shown in FIG. 2A, hydraulic pressure in the valve seat chamber 4 moves the valve seat member 18 leftward, and the valve seat member 18 moves the first valve member 30 leftward. As a result, the valve seat member 18 is received by a left end wall of the valve seat chamber 4, as shown in FIG. 2B. Furthermore, the pressure oil in the valve seat chamber 4 passes through the throttle passage 21 in the valve seat member 18 to press the first valve member 30 leftward. However, the first valve surface 35 of the first valve member 30 is hermetically brought into contact with the first valve seat 25 of the valve seat member 18 by the first relief spring 40, and therefore the main relief valve 10 is still closed.

Figure 2C:
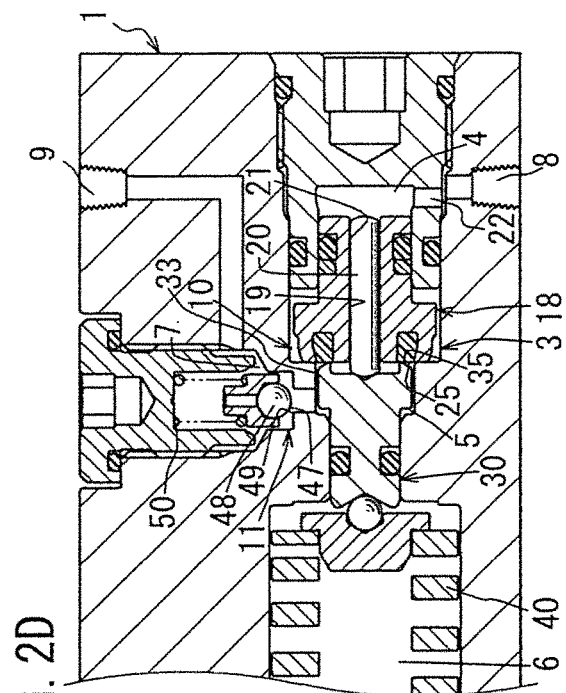
Figure 2B:
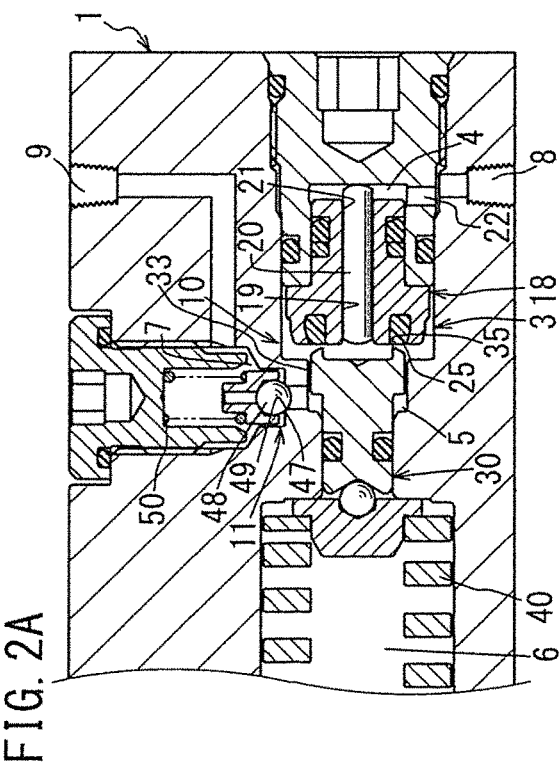

When the hydraulic pressure in the valve seat chamber 4 exceeds the pressure equivalent to the biasing force of the first relief spring 40 (relief pressure of the main relief valve 10), the main relief valve 10 is opened, as shown in FIG. 2C. Then, the pressure oil flows out of the valve seat chamber 4 to the valve chamber 5. When the hydraulic pressure in the valve chamber 5 exceeds the pressure equivalent to the biasing force of the second relief spring 50 (relief pressure of the auxiliary relief valve 11), the auxiliary relief valve 11 is opened.

Figure 2D:
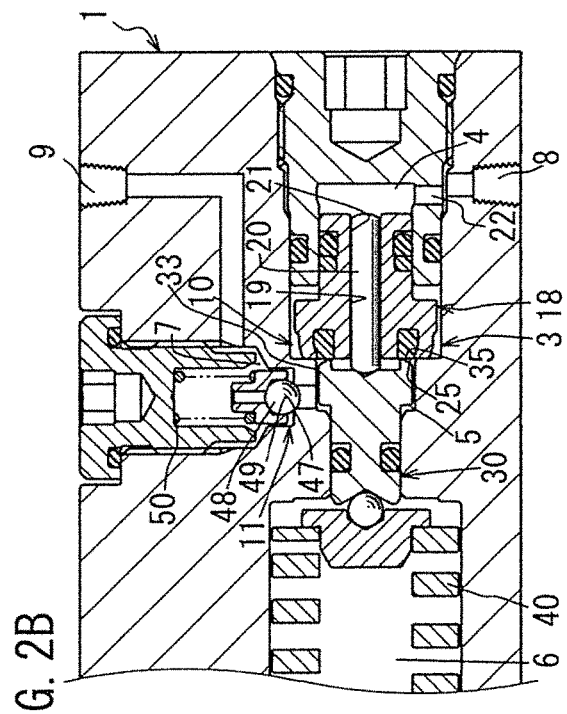

As shown in FIG. 2C, as the pressure oil in the valve chamber 5 is discharged to the second relief valve chamber 7 after the main relief valve 10 and the auxiliary relief valve 11 are opened, the hydraulic pressure in the valve seat chamber 4 decreases, and then falls below the pressure equivalent to the biasing force of the first relief spring 40. As a result, as shown in FIG. 2D, the main relief valve 10 is closed but the auxiliary relief valve 11 remains open until the hydraulic pressure in the valve chamber 5 falls below the pressure equivalent to the biasing force of the second relief spring 50. When the hydraulic pressure in the valve chamber 5 falls below the pressure equivalent to the biasing force of the second relief spring 50, the auxiliary relief valve 11 is closed, as shown in FIG. 2B.

The above-described First Embodiment has the following advantageous effects.

When the pressure of the pressure fluid in the valve seat chamber 4 exceeds the relief pressure of the main relief valve 10, the main relief valve 10 is opened, with the result that the pressure fluid flows to the valve chamber 5. At this time, because the pressure in the valve chamber 5 is kept at a predetermined value by the auxiliary relief valve 11, there is a small difference between the pressure in the valve seat chamber 4 and the pressure in the valve chamber 5. For this reason, the pressure fluid gently flows through the gap between the first valve seat 25 and the first valve surface 35 of the main relief valve 10. This prevents rapid wearing out of at least one of the first valve seat 25 and the first valve surface 35, to improve the durability of the relief valve device.

Figure 3:
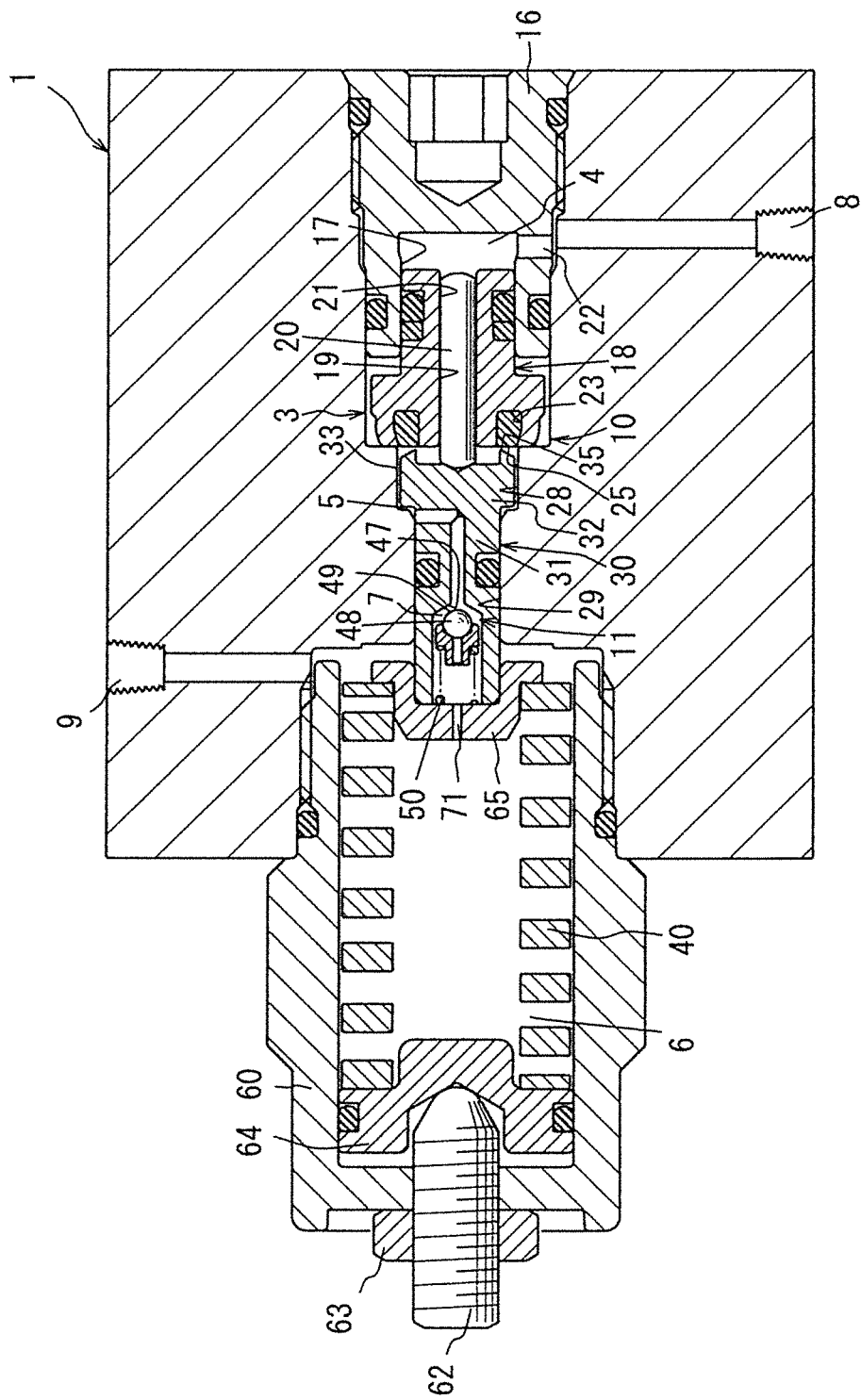
FIG. 3 shows Second Embodiment of the present invention, and is a diagram similar to FIG. 1.

FIG. 3 shows Second Embodiment of the present invention. In Second Embodiment, the components the same as or similar to the components in First Embodiment are given the same reference numerals, in principle.

Second Embodiment is different from the above-described First Embodiment in that the auxiliary relief valve 11 is provided inside the first valve member 30.

A spring case 60 is screwed into a left end portion of the valve case 1. The spring chamber 6 is formed in the spring case 60 to extend over the left end portion of the valve case 1. An adjustment screw 62 and a locknut 63 are attached to a left end portion of the spring case 60. A spring receiver 64 is disposed in a left end portion of the spring chamber 6, and a spring seat 65 is disposed in a right end portion of the spring chamber 6. The first relief spring (first biasing member) 40 disposed between the spring receiver 64 and the spring seat 65 biases the first valve member 30 rightward via the spring seat 65.

The second relief valve chamber 7 is provided inside the first valve member 30, and the second valve seat 47 is provided on a right end portion of the second relief valve chamber 7. The second valve surface 49 on the ball (second valve member) 48 is biased toward the second valve seat 47 by the second relief spring (second biasing member) 50. The valve chamber 5 is communicatively connected to the central portion of the second valve seat 47. A passage 71 provided in the spring seat 65 establishes communication between the second relief valve chamber 7 and the spring chamber 6. The outlet hole 9 provided at an upper portion of the valve case 1 is communicatively connected to an upper portion of the spring chamber 6.

The above-described Second Embodiment has the following advantageous effects.

The auxiliary relief valve 11 is easily machined as compared with a case where the auxiliary relief valve 11 is provided in the valve case 1. This enables efficient production and compactness of the relief valve device.

The above-described embodiments are changeable as follows.

Instead of the pressure oil described by way of example, pressure fluid supplied to the relief valve device may be another type of pressure liquid or compressed air.

The above-described auxiliary relief valve 11 may be structured similarly to the main relief valve 10.

The valve seat member 18 may be fixed to the first relief valve chamber instead of being inserted into the valve seat chamber 4 so as to be movable. Alternatively, the valve seat chamber 4 and the valve seat member 18 may be omitted. In the above alternative, the first valve seat is provided on a right end wall of the valve chamber 5 of the first relief valve chamber 3.

The first valve member 30 may have a straight cylindrical shape instead of the shape having the smaller diameter portion 31 and the larger diameter portion 32, described above by way of example.

The first biasing member and the second biasing member each may be a fluid pressure cylinder, instead of the first relief spring 40 and the second relief spring 50 described by way of example.

Moreover, it is a matter of course that other changes or alterations can be made on the present invention within the scope of envisagement of one skilled in the art.

REFERENCE SIGNS LIST

1: valve case; 3: first relief valve chamber; 7: second relief valve chamber; 10: main relief valve; 11: auxiliary relief valve; 18: valve seat member; 19: through hole; 20: pin; 21: throttle passage; 25: first valve seat; 30: first valve member; 35: first valve surface; 40: first biasing member (first relief spring); 47: second valve seat; 48: second valve member (ball); 49: second valve surface; 50: second biasing member (second relief spring).

The invention claimed is:

1. A relief valve device comprising a main relief valve (10) and an auxiliary relief valve (11), wherein a first relief valve chamber (3) of the main relief valve (10) and a second relief valve chamber (7) of the auxiliary relief valve (11) are communicatively connected in order in a valve case (1), the main relief valve (10) comprises:
a valve seat member (18) hermetically provided in the first relief valve chamber (3) to be movable;
a first valve member (30) inserted into the first relief valve chamber (3) so as to be movable, and biased toward the valve seat member (18) by a first biasing member (40) provided in the valve case (1);
an annular first valve surface (35) provided on an end face of the first valve member (30);
a first valve seat (25) provided so as to face the first valve surface (35), the first valve seat (25) being formed by an elastic member attached to an annular groove (23) formed at an end portion of the valve seat member (18); and
a through hole (19) formed in the valve seat member (18), the through hole (19) allowing a valve seat chamber (4) which constitutes the first relief valve chamber (3) and is on the inlet side to always communicate with a space sealed by the first valve seat (25) and the first valve surface (35), the auxiliary relief valve (11) comprises:
a second valve member (48) inserted into the second relief valve chamber (7) so as to be movable;
a second valve surface (49) provided on the second valve member (48);
a second valve seat (47) provided in the second relief valve chamber (7) so as to face the second valve surface (49); and
a second biasing member (50) provided in the valve case (1) so as to bias the second valve surface (49) toward the second valve seat (47), and
a relief pressure of the auxiliary relief valve (11) set by the second biasing member (50) is lower than a relief pressure of the main relief valve (10) set by the first biasing member (40);
wherein pressure fluid supplied to the main relief valve (10) is discharged after passing through the valve seat chamber (4), the through hole (19), a gap between the first valve seat (25) and the first valve surface (35) of the main relief valve (10), and a gap between the second valve seat (47) and the second valve surface (49) of the auxiliary relief valve (11) in this order.

2. The relief valve device according to claim 1, wherein the auxiliary relief valve (11) is provided inside the first valve member (30).

3. The relief valve device according to claim 1, wherein:
a pin (20) which is different from the first valve member (30) is inserted into the through hole (19); and
a fitting gap between the pin (20) and the through hole (19) forms a throttle passage (21).

4. The relief valve device according to claim 1, wherein:
when the pressure fluid is supplied to the main relief valve (10), the valve seat member (18) moves the first valve member (30) by pressure of the pressure fluid, and the valve seat member (18) is received by an end wall of the valve seat chamber (4).

5. The relief valve device according to claim 3, wherein:
a concave portion is formed in an end face on the valve seat member (18) side of the first valve member (30), and
when the pressure fluid is supplied to the main relief valve (10), the valve seat member (18) moves the first valve member (30) by pressure of the pressure fluid, and the valve seat member (18) is received by an end wall of the valve seat chamber (4) and the pin (20) is inserted into the concave portion.

* * * * *